United States Patent [19]
Salz et al.

[11] 3,773,456
[45] Nov. 20, 1973

[54] APPARATUS FOR THE PRODUCTION OF FLARING PORTIONS OF HOLLOW BODIES

[75] Inventors: Richard Salz, Dreisel near Dattenfeld; Johann Karp, Mondorf, both of Germany

[73] Assignee: Dynamit Nobel Aktiengesellschaft, Troisdorf, Germany

[22] Filed: July 19, 1971

[21] Appl. No.: 163,589

[30] Foreign Application Priority Data
July 23, 1970  Germany................... P 20 36 607.8

[52] U.S. Cl................. 425/384, 425/393, 425/392, 425/457, 425/460
[51] Int. Cl. ........................................... B29c 17/02
[58] Field of Search.................... 425/384, 392, 393, 425/459, 460; 72/117; 29/523

[56] References Cited
UNITED STATES PATENTS 3,205,535  9/1965  Niessner et al. ................. 425/393 X
2,484,632  10/1949  Marsh .................................. 72/117
1,805,126  5/1931  Barker ................................ 72/117
583,766  6/1897  Nelson ................................ 72/117
2,924,263  2/1960  Landis ................................ 72/117
729,099  5/1903  Smith .................................. 72/85

*Primary Examiner*—Robert L. Spicer, Jr.
*Attorney*—Craig, Antonelli & Hill

[57] ABSTRACT

An apparatus for forming socket and bead configurations in tubular bodies including a divided external mold, an expanding mandrel having two parts between which a sizing ring is provided. The sizing ring is rotatably mounted on a slide element supported in a rotatable guide member. By setting the guide member into rotation the sizing ring scribes a circular path about the central axis of the expanding mandrel. A radial-displacing cylinder is provided for shifting the slide element and thus sizing ring 3 in the radial direction. Also disclosed is the method resulting from the use of the above apparatus.

16 Claims, 4 Drawing Figures

INVENTORS
RICHARD SALZ
JOHANN KARP

BY
Craig, Antonelli + Hill
ATTORNEYS

APPARATUS FOR THE PRODUCTION OF FLARING PORTIONS OF HOLLOW BODIES

This invention relates to an apparatus for the production of flared portions of hollow bodies, especially of thermoplastic synthetic resin pipes. Such enlargements of the inside diameter are required, for example, in plastic pipes if the pipes are to be joined together by means of socket plugin connections. In this process one pipe end is expanded into a socket into which the unexpanded end of the other pipe is inserted. The socket is suitably provided with an additional bead receiving a sealing ring.

In this connection, strict regulation of the interior configuration of the widened portion is important. The socket diameter and the bead diameter, as well as the shape of the bead must be accurately maintained. The seal of the pipe couple and also the guidance of the insert pipe end into the pipe socket depend decisively on this factor. In addition, this provision precludes damage to the sealing rings to be accommodated in the bead.

Conventionally beads are produced by means of pressing the hollow body, for example, by means of oil pressure or air pressure against an outer shaped surface. The corresponding bead formed on the surface of the respective hollow body is well shaped only on the outer profile. The dimensional accuracy of the interior, which is of special importance, leaves much to be desired.

In order to counteract these disadvantages, a suggestion has been advanced to injection-mold hollow bodies with thick walls at some places (or with external beads) and then to form the beads by cutting the inside with steel cutters on specialized machines. Such a process is expensive due to the wasted material. Additionally relatively long molding times are required due to the large accumulation of material. Moreover, the sharp cutting edges produced during the formation of the beads can damage the sealing ring receivable therein.

It is also known to introduce into the hollow bodies complicated cores, which can be split up into components. The bodies under the influence of the cores are then expanded to form sockets and beads. In this process, the core must be capable of being reduced to such a radial dimension that it can be pulled out of the thus-manufactured pipe socket and bead. In this manner, it is possible to produce sockets and beads which are very accurate from the viewpoint of their dimensions. Unfortunately, these devices are very expensive and trouble-prone because they are so complicated, and do not permit the inclusion of heating or cooling media which would accelerate the operation. Also, a change of the depth of the bead is possible only by the use of a new core.

The above-described disadvantages are overcome by the present invention which relates to an apparatus for the production of cross-sectional changes in hollow bodies with a divided outer mold and an expanding mandrel. The expanding mandrel consists of two parts having disposed therebetween a sizing ring which is rotatably mounted on a slide element which is disposed in a guide member. The sizing ring is settable into rotation by a drive, and disposable, by a radially movable cylinder, into a circular path around the central axis of the expanding mandrel. A clamping device with an axially displacing mechanism is provided to move the above-described parts into and out of the hollow body.

The expanding mandrel is inserted, for producing the socket, into the hollow body at the end thereof, the mandrel having the internal contours of the resultant hollow body. The external mold as well as the expanding mandrel are suitably penetrated by channels serving for the through-flow of cooling or heating media and thereby accelerating the manufacturing process.

The sizing ring which is rotatably disposed on the slide element is inserted into the hollow body with the expanding mandrel and set into rotation. The slide element can be adjusted by a radially movable cylinder until abutment at a stop. The stop can be varied by means of a setscrew and depends on the height of the bead to be produced. While the slide element, together with the sizing ring, is gradually moved, by the lifting cylinder, up to this stop, the sizing ring rotates and describes a circular path about the central axis of the hollow body, whereby the bead is formed. In this connection, the sizing ring exhibits the internal contours of the resultant bead.

By the gradual formation of the bead on the inner surface of the hollow body, the desired dimensional accuracy is realized. Weakened portions in the wall thickness of the hollow body do not occur, since no diminished amount of material exists at the point of the bead, because, by the pressure of the sizing ring on the edge of the hollow body, the material is replenished in accordance with the progressive shaping of the bead.

After the formation of the socket and the bead, the end of the hollow body is cooled, while the rotating motion of the sizing ring is continued until the cooling operation is completed. This effects a particularly high dimensional accuracy of the inner contour of the socket as well as of the bead, since the hollow body does not change after cooling.

The entire construction of this appratus is designed so that all standard sizes of pipes can be utilized without trouble. All that is required is customary maintenance which attends a fully continuous mode of operation of long duration.

Furthermore, the apparatus exhibits, at all necessary points, channels for the accommodation of cooling or heating media. This ensures an accurate and rapid manufacture of the shaped pipe.

Additionally, the controlled movement of the slide element is capable of entraining the material from marginal zones during the forming of the bead in a more satisfactory manner than obtained when the shaping process is carried out too quickly.

The depth of the bead can be adjusted herein without varying the core or any other guide members. This is of importance for the reason that shrinking values and other influences always necessitate an additional adjustment.

The present invention will be explained in greater detail below with reference to one embodiment of the invention as shown in the drawings.

Figure 1:
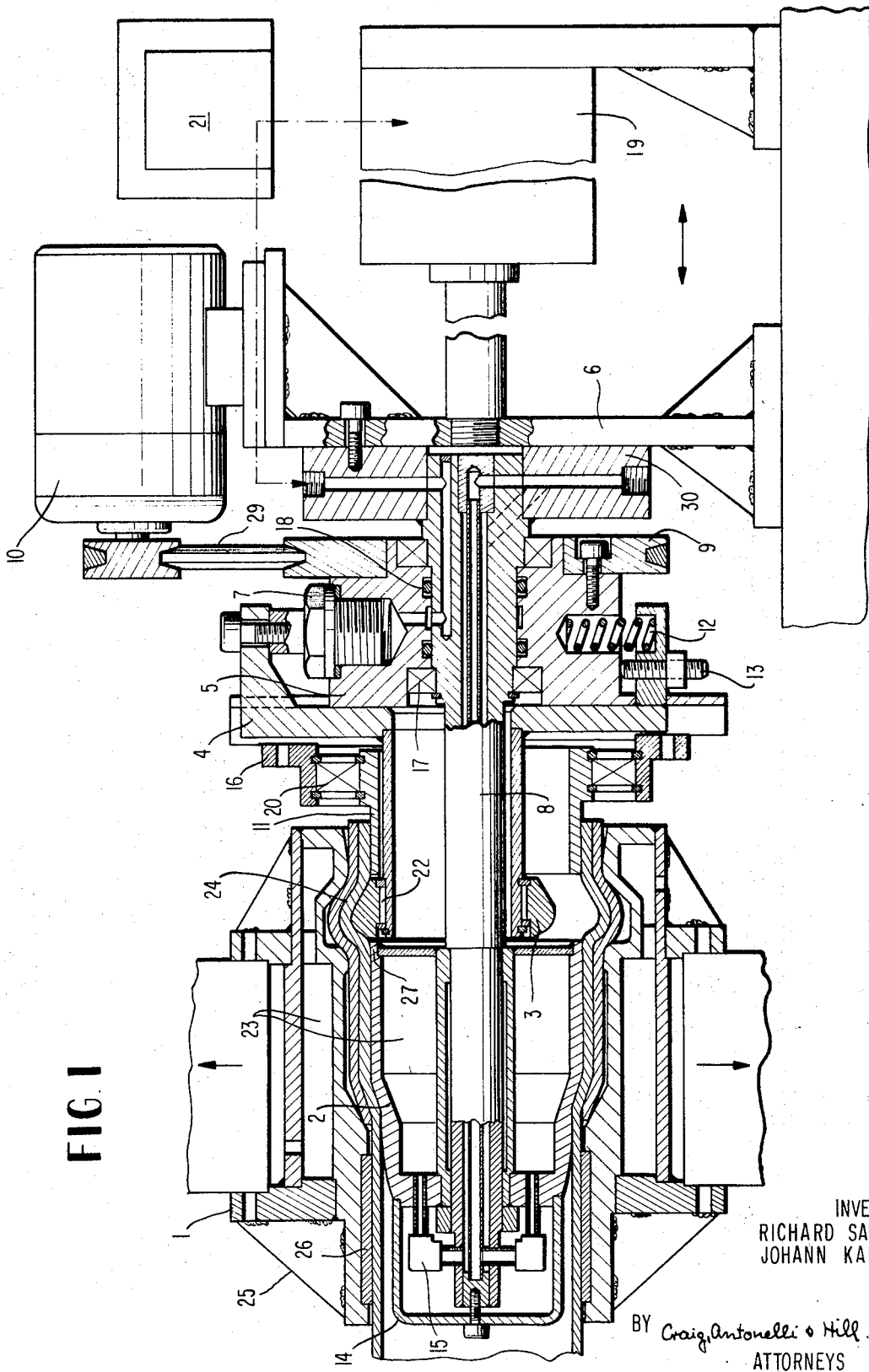
FIG. 1 shows an embodiment of the apparatus of this invention in a sectional view.

Referring to FIG. 1, external mold 1 is divided into upper and lower portions which are held by appropriate fastening elements, for example, in press 25. In the external mold, rubber insert 26 is disposed for effecting a better adhesion with the hollow body 24. Channels 23 pass through the external mold 1, as well as front portion 2 of expanding mandrel 27, to permit heating and cooling of hollow body 24 thereby controlling temperature variations occurring during the manufacturing process.

Front portion 2 of expanding mandrel 27 is mounted on centering shaft 8 and provided, on the side facing the interior of the pipe, with cap 14 to protect the coupling threads 15. Rear portion 11, which constitutes the second section of expanding mandrel 27, is rotatably connected with guide member 5 by ball bearings 20, for example.

Sizing ring 3, disposed between the front and rear portions 2 and 11 of expanding mandrel 27, exhibits the appropriate external shape of the bead to be formed and is rotatably connected via a bearing bushing to dovetail-shaped slide element 4. For mounting and supporting sizing ring 3, needle cage 22 can be employed, for example. Slide element 4 furthermore includes a clamping section for receiving radially movable cylinder 7, as well as stop 13 having a setscrew. By means of the setscrew, the depth of the bead can be adjusted to the desired magnitude.

Figure 3:
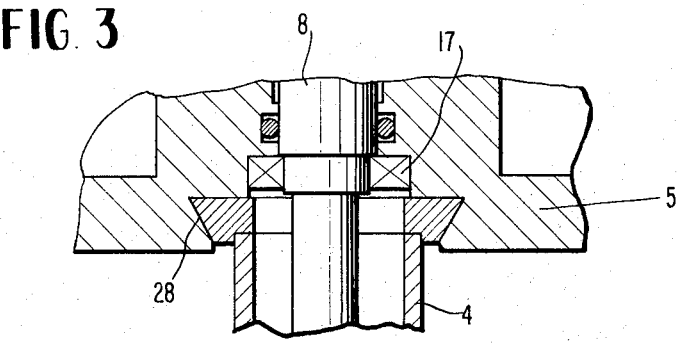
FIG. 3 shows a fragmentary view detailing the mounting of the slide element in the guide member of the apparatus shown in FIG. 1.

Guide member 5 has dovetail guide 28 (see FIG. 3) for receiving the slide element 4, as well as bearing bushing 16 for receiving the expanding mandrel portion 11. Furthermore, guide member 5 has a bore for cylinder 7, as well as bearing 17 for centering the apparatus and drive wheel 9. For sealing with respect to centering shaft 8, sealing rings 18 can be provided.

Clamping device 6 consists of centering and guide part 30 receiving on one side guide member 5 and being connected, on the opposite side, with displacing mechanism 19 which moves the entire device forward or backward in the axial direction and also carries the structure of drive assembly 10.

Centering shaft 8 is suitably provided with bores for the throughflow of cooling or heating media, respectively, for exapnding mandrel portion 2, as well as for the actuation of cylinder 7. Drive wheel 9 serves for transmitting the rotating motion for the device. Drive wheel 9 is coupled with regulatable drive mechanism 10 via, for example, belt 29.

Guide member 5 is equipped, on the side opposed to the bore for cylinder 7, likewise with a bore receiving return spring 12, which latter connects slide element 4 with guide member 5 and serves for relieving the stress on cylinder 7.

The actuation of cylinder 7 and displacing mechanism 19 can be effected with the aid of hydraulic device 21, but can also be conducted in some other manner.

Figure 2:
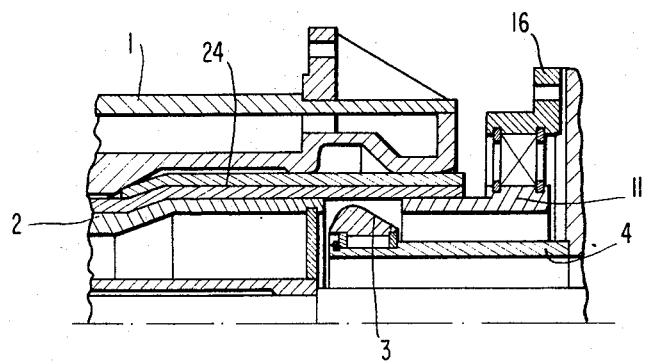
FIG. 2 shows a fragmentary view of the same apparatus after the formation of a pipe socket.
Figure 4:
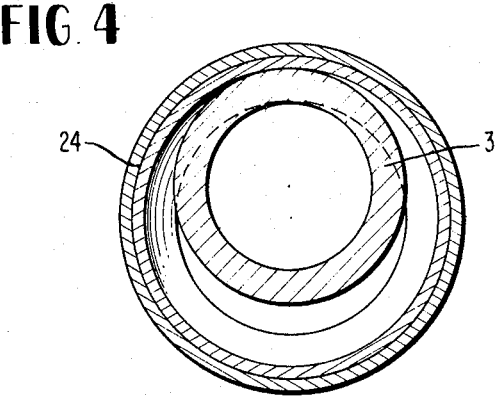
FIG. 4 shows a transverse section through the shaped pipe illustrating how the bead is formed in the pipe according to the present invention.

In order to produce the socket and bead, pipe 24 is placed, in the thermoplastic condition, into divided external mold 1. Thereafter, displacing mechanism 19 is actuated, which guides clamping device 6 axially toward pipe 24 and, thus, expanding mandrel 27 is inserted into the pipe end. Thereby, the socket is, first of all, formed at the pipe end (see FIG. 2). During this procedure, it is possible, for example, to have hot water flow through channels 23. Sizing ring 3 is, at this point, in the initial position wherein it does not contact the inner wall of pipe 24. By setting drive assembly 10 into operation, guide member 5 is placed into rotation. Simultaneously, cylinder 7 is actuated, which slowly moves slide element 4 radially away from the central axis in conjunction with sizing ring 3 up to stop 13. During this procedure, sizing ring 3 rotates along a circular path about the central axis and rolls along inner wall of pipe 24 (see FIG. 4). The diameter of the circular path of sizing ring 3 increases as long as cylinder 7 moves radially outward. In the final position, its diameter is larger than the inside diameter of the socket. The rotating motion of guide element 5 as well as of the sizing ring 3 is continued in the final position until pipe 24 is cooled. During this period channels 23 suitably have a cooling medium flowing therethrough. Thereafter, drive assembly 10 is switched off, slide element 4 with sizing ring 3 is moved back to the central axis by the cylinder 7, and the entire expanding device is pulled out of the pipe 24 by displacing mechanism 19. By opening external mold 1 and withdrawing pipe 24, the manufacturing process is terminated. Rubber insert 26 in the external mold 1 has the effect, in this connection, that pipe 24 adheres more satisfactorily, so that, due to the rotating motion of the sizing ring 3, it cannot shift in the axial direction.

Part 11 of the expanding mandrel 24 is mounted in guide member 5 suitably in such a manner that part 11 is in the rest position during the rotation of guide member 5, i.e., in the inserted position of the expanding device and thus prevents friction or grinding against the inner surface of the socket. For this reason, ball bearing 20 was provided in guide member 5 for supporting the part 11.

It is understood that the embodiment disclosed herein is susceptible to numerous changes and modifications, as will be apparent to a person skilled in the art. Accordingly, the present invention is not limited to the details shown and described herein but intended to cover any changes and modifications within the scope of the invention.

We claim:

1. An apparatus for expanding a hollow body comprising an external mold means for containing said hollow body, an expanding mandrel means for shaping said hollow body receivable within said external mold means, said expanding mandrel means being divided into two parts, sizing ring means for expanding a portion of said hollow body being receivably rotatable between the two parts, and displacing means connected to said expanding mandrel means for moving the same into and out of said external mold means and for engagement with said hollow body.

2. An apparatus according to claim 1 further comprising means for rotating said sizing ring and means for displacing said sizing ring means in the radial direction so that said sizing ring can be rotatably and radially advanced into contact with the inner wall of said hollow body to cause the expansion of the contacted portion.

3. The apparatus according to claim 2 wherein heat exchange means are additionally provided for heating and cooling said hollow body.

4. An apparatus for radially expanding portions of a tubular body comprising an external mold means for axially receiving said tubular body, expanding mandrel means axially-disposable within said external mold means and adapted to contact and shape at least an axial portion of said tubular body, said expanding mandrel means being divided into a first section and a second section, sizing ring means for radially expanding a portion of said tubular body by rolling contact therewith, said sizing ring means being receivable between said first and second sections of said expanding mandrel means, and displacement means for axially-displacing said expanding mandrel means.

5. An apparatus according to claim 4 wherein said apparatus further comprises guide means rotatable with respect to the axis of said expanding mandrel means, slide means settable in rotation with said guide means and radially movable with respect thereto, said slide means rotatably received within said second section of said expanding mandrel means, means for radially moving said slide means connected thereto, and said sizing ring means being rotatably mounted on said slide means.

6. An apparatus according to claim 5 further comprising motor means connected to said guide means for setting the same into rotation, and wherein said expanding mandrel means is rotatably connected with respect to said guide means and said displacement means engages said guide means.

7. An apparatus for widening a hollow body comprising an external mold means for supporting said hollow body, a mandrel means receivable within said external mold means and having first and second portions, sizing ring means receivably rotatable between said first and second portions, guide means adapted to rotate said sizing ring means, slide means rotatably attached with respect to said sizing ring at one end thereof and at the other end mounted on said guide means for radial displacement with respect thereto, displacement means engaging said slide means for effecting radial displacement thereof, drive means for setting said guide means into rotation whereby the outer edge of said sizing ring means can be moved radially-outward until a circle of predetermined radius is scribed about the axis of rotation of said guide means.

8. An apparatus according to claim 7 wherein said mandrel means is an expanding mandrel means and wherein said external mold means is a divided external mold means.

9. An apparatus according to claim 7 wherein the central axis of said mandrel means coincides with that of said guide means.

10. An apparatus according to claim 7 further comprising displacing means operably connected to said guide means for jointly, axially displacing said sizing ring, slide and guide means.

11. An apparatus according to claim 7 wherein said external mold means includes insert means for securing said hollow body and channel means adapted to permit the circulation of a heating or cooling fluid therethrough.

12. An apparatus according to claim 8 wherein said expanding mandrel means exhibits an external configuration corresponding to the resultant internal configuration of the hollow body and is provided with channel means permitting the circulation of heating or cooling fluids therethrough.

13. An apparatus according to claim 8 wherein said sizing ring means has an external configuration corresponding to the internal configuration of the bead formed thereby.

14. An apparatus according to claim 8 wherein said slide means is radially displaceable by said displacement means until abutment against an adjustable stop means.

15. An apparatus according to claim 8 wherein the second portion of said mandrel is rotatably supported by said guide means.

16. An apparatus according to claim 4, further comprising heat exchange means for heating and cooling said hollow body, said heat exchange means being disposed adjacent to the radially expanding portions of the tubular body.

* * * * *